United States Patent
Entringer et al.

(10) Patent No.: US 9,759,581 B2
(45) Date of Patent: Sep. 12, 2017

(54) ELECTRONIC MEASUREMENT CIRCUIT

(71) Applicant: EM MICROELECTRONIC MARIN S.A., Marin (CH)

(72) Inventors: Christophe Entringer, Corcelles-pres-Concise (CH); Luca Rossi, Lausanne (CH); Sylvain Grosjean, Les Fins (FR); Jean-Michel Daga, Aix-en-Provence (FR)

(73) Assignee: EM MIRCOELECTRONIC MARIN S.A., Marin (CH)

( * ) Notice: Subject to any disclaimer, the term of this patent is extended or adjusted under 35 U.S.C. 154(b) by 113 days.

(21) Appl. No.: 14/995,585

(22) Filed: Jan. 14, 2016

(65) Prior Publication Data

US 2016/0245672 A1     Aug. 25, 2016

(30) Foreign Application Priority Data

Feb. 23, 2015   (EP) .................................... 15156122

(51) Int. Cl.
*G01R 27/26*      (2006.01)
*G01D 5/241*      (2006.01)
(Continued)

(52) U.S. Cl.
CPC ............. *G01D 5/2417* (2013.01); *G01D 5/24* (2013.01); *G01P 15/125* (2013.01)

(58) Field of Classification Search
CPC ....... G01D 5/2417; G01D 5/24; G01P 15/125
See application file for complete search history.

(56) References Cited

U.S. PATENT DOCUMENTS 5,974,895 A * 11/1999 Steger ..................... G01D 5/24
                                                        73/514.32
6,497,149 B1    12/2002 Moreau et al.
(Continued)

FOREIGN PATENT DOCUMENTS

DE          197 43 288 A1    4/1999
DE     10 2005 031607 A1    2/2006

OTHER PUBLICATIONS

Brian P. Brandt et al., "Second-Order Sigma-Delta Modulation for Digital-Audio Signal Acquisition", IEEE Journal of Solid-State Circuits, Apr. 1991, pp. 618-627, vol. 26, No. 4.
(Continued)

*Primary Examiner* — Daniel Miller
(74) *Attorney, Agent, or Firm* — Sughrue Mion, PLLC

(57) ABSTRACT

The electronic measurement circuit comprises a measurement sensor with two differential mounted capacitors each comprising a fixed electrode, and a common electrode arranged to move relative to the fixed capacitor electrode to alter the capacitive value when the physical parameter is measured. The circuit further comprises a first integrator unit connected to the common electrode for integrating charge received from the sensor, and comprising two integrators arranged to be connected alternately to the common electrode, a first comparator for comparing analogue output values from the first integrator unit, a second integrator unit for integrating charge received from the first integrator unit, a second comparator for comparing analogue output values from the second integrator unit, a switch circuit for switching different voltage values across the capacitors, and a feedback circuit for feeding a digital output signal from the first comparator to the switch circuit for controlling its operation, and an incremental calculation unit receiving
(Continued)

digital output signals from the comparators and supplying a final digital output signal.

12 Claims, 2 Drawing Sheets

(51) Int. Cl.
*G01D 5/24* (2006.01)
*G01P 15/125* (2006.01)

(56) References Cited

U.S. PATENT DOCUMENTS

2007/0236373 A1  10/2007  Hellwig et al.
2010/0231237 A1   9/2010  Deschildre et al.

OTHER PUBLICATIONS

Erwin Janssen et al., "Basics of Sigma-Delta Modulation", Look-Ahead Based Sigma-Delta Modulation, Jan. 2011, pp. 5-28.
European Search Report of 15 15 6122 dated Apr. 21, 2015.

* cited by examiner

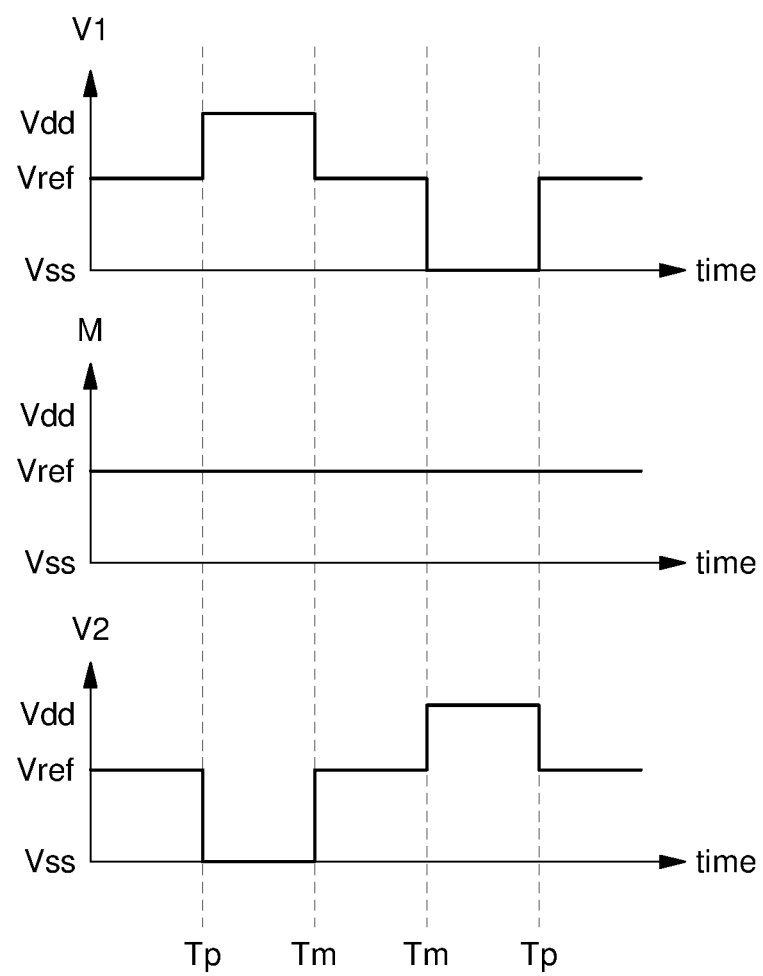

ELECTRONIC MEASUREMENT CIRCUIT

This application claims priority from European Patent Application No. 15156122.2 filed on Feb. 23, 2015, the entire disclosure of which is hereby incorporated herein by reference.

TECHNICAL FIELD

The invention relates to the field of measurement circuits for measuring a physical parameter. More specifically, the present invention relates to measurement circuits comprising a capacitive sensor. The invention also relates to a corresponding method of measuring a physical parameter, and to a computer program product.

BACKGROUND OF THE INVENTION

Capacitive sensors used for measuring a physical parameter may comprise a mobile common electrode that forms part of an armature resiliently held between two fixed electrodes. This common electrode is capable of moving a certain distance in the direction of one or the other of the fixed electrodes as a result of an applied force, for example. In the inoperative state, the common electrode is at an approximately equal distance from the two fixed electrodes, which defines equal capacitive values for the two capacitors. When the common electrode moves, for example as the result of an applied force, the capacitive value of each capacitor varies inversely to the capacitive value of the other. The electronic interface circuit of a capacitive sensor is thus arranged to provide an output signal in the form of a voltage dependent on the variation in the capacitance of the two capacitors. This kind of capacitive sensor can be used for instance to measure acceleration values.

An electrical interface circuit is connected to the measurement sensor to process the signal from the measurement sensor. Conventional interface circuits, such as the one described in the patent U.S. Pat. No. 8,429,981 B2, use a digital-to-analogue converter (DAC) in order to provide voltage as input for pre-charging the capacitances of the capacitive measurement sensors. The resolution of this DAC is directly linked to the resolution of the digital output of the measurement circuit. For instance a 10-bit resolution output needs a 10-bit resolution DAC in a feedback circuit of the interface circuit. The conventional techniques may be very efficient for a low resolution output (e.g. up to a 10-bit resolution). However, some linearity problems inherent to the precision of the DAC appear beyond this resolution. Furthermore, in the existing solutions, a repetitive pre-charge phase is needed for pre-charging the measurement sensor capacitances. However, the disadvantage of this pre-charge phase is that no measurement signal is generated during this phase, while some energy is used to charge the capacitors.

The patent application US 2007/0247171 A1 describes an electronic interface circuit of one or two capacitors with variable capacitance. Said interface circuit includes a differential integrating amplifier with two inputs, a switching circuit for charging each capacitor by different voltages in a first phase, and to connect a fixed electrode of each capacitor to one respective input in a second phase. Each capacitor is biased by reverse different voltages in a third phase, and their fixed electrode is connected to a respective input of the amplifier in a fourth phase. A common electrode of the capacitors is connected to earth. The two output signals from the amplifier are compared in a comparator to control the switched capacitor circuit. The operation of said electronic interface circuit is relatively long to obtain a measured value at output, and the excitation of the capacitors is performed in a symmetrical manner, which are drawbacks.

The patent application US 2010/0231237 A1 describes an electronic circuit with a capacitive sensor for measuring a physical parameter. The sensor includes two capacitors mounted in differential, whose a common electrode is connected to one input of a charge transfer amplifier. An integrator is connected to the output of the charge transfer amplifier and is controlled by a dynamic comparator. The measured output of the integrator can be applied to the fixed electrodes of the capacitors through an excitation unit in a first phase of operation. In a second phase, the fixed electrodes of the capacitors are biased by two different voltages through the excitation unit. It is necessary to have several measuring cycles to obtain a final measured value at output of the electronic circuit, which is a drawback.

In the patent applications DE 10 2005 031607 A1 and US 2007/0236373 A1, it is only described a circuit for converting the capacitive signal change of a differential capacitor into digital signals. Different capacitors can be connected to an input of an integration amplifier followed by a comparator.

SUMMARY OF THE INVENTION

It is an object of the present invention to overcome the problems identified above related to the operation or structure of measurement circuits which use capacitive sensors as measurement sensors.

According to a first aspect of the invention, there is provided an electronic measurement circuit for measuring a physical parameter, the circuit comprising:
  a measurement sensor comprising two differential mounted capacitors each comprising a fixed electrode, and a common electrode, common to the two capacitors which is arranged to be movable relative to each fixed electrode of the two capacitors in order to alter the capacitive value of each capacitor when the physical parameter is measured;
  a first integrator unit connected to the common electrode for integrating charge received from the measurement sensor, and comprising two integrators arranged to be connected alternately to the common electrode;
  a first comparator for comparing analogue output values from the two integrators of the first integrator unit and for supplying a first digital output signal,
  a second integrator unit connected to integrate charge received from the first integrator unit, the second integrator unit comprising two integrators arranged to integrate charge alternately from the two integrators of the first integrator unit;
  a second comparator for comparing analogue output values from the two integrators of the second integrator unit and for supplying a second digital output signal;
  a switch circuit connected to the measurement sensor for switching different voltage values across the two capacitors;
  a feedback circuit for feeding the first digital output signal from the first comparator to the switch circuit for controlling the operation of the switch circuit, and
  an incremental calculation unit receiving the first digital output signal from the first comparator and the second digital output signal from the second comparator for supplying a final digital output signal of this measurement circuit.

The proposed new solution has the advantage that a high resolution output signal is obtained by an incremental principle in an electronic measurement circuit. Contrary to the electronic circuits using continuous sigma delta technique, this operation of the present electronic measurement circuit allows making analog to digital conversion on a single shot mode. Furthermore it is possible to reduce drastically the number of samples needed to make the estimation by keeping a high resolution and having a quite good linearity. For example in a continuous technique, it can be provided 200 samples, whereas in this present invention with incremental principle, it can be provided only 128 samples for determining the measurement output signal.

Advantageously thanks to this virtual ground in the central node (common electrode of both capacitors), the signal does not depend on the parasitic capacitance any more. The signal is not adversely affected by the central parasitic capacitance. Moreover, all the voltage transitions across the sensor capacitors during a given value of the feedback signal from the first comparator are used to generate the effective measurement output signal/improve resolution.

Advantageously it is provided to have the mean electrostatic force applied by the two fixed electrodes to the central electrode or to the moving mass, which is zero. Furthermore there is an adaptation of the consumption per resolution needed.

According to a second aspect of the invention, there is provided a method of measuring a physical parameter by an electronic measurement circuit comprising a measurement sensor comprising two differential mounted capacitors, each comprising a fixed electrode, and a common electrode, common to both of the capacitors, which is arranged to be movable relative to each fixed electrode of the two capacitors in order to alter the capacitive value of each capacitor when the physical parameter is measured, the method comprising:
  a first integrator unit connected to the common electrode integrating charge received from the measurement sensor, wherein the first integrator unit comprises two integrators connected alternately to the common electrode and performing the integration of the charge alternately;
  a first comparator comparing analogue output values from the two integrators of the first integrator unit and supplying a first digital output signal,
  a second integrator unit connected to integrate charge received from the first integrator unit, the second integrator unit comprising two integrators performing the integration of the charge alternately from the two integrators of the first integrator unit;
  a second comparator comparing analogue output values from the two integrators of the second integrator unit and supplying a second digital output signal;
  a feedback circuit feeding a digital output signal from the first comparator to a switch circuit connected to the measurement sensor;
  the switch circuit varying the voltage across the two capacitors as a function of the received first digital output signal, and
  an incremental calculation unit receiving the first digital output signal from the first comparator and the second digital output signal from the second comparator, and supplying a binary output signal of this measurement circuit.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which:
FIG. 2 is a diagram illustrating voltage switching of measurement sensor capacitors in the circuit of FIG. 1 for digital feedback signals having two possible values.

DETAILED DESCRIPTION OF EMBODIMENTS OF THE INVENTION

Figure 1:
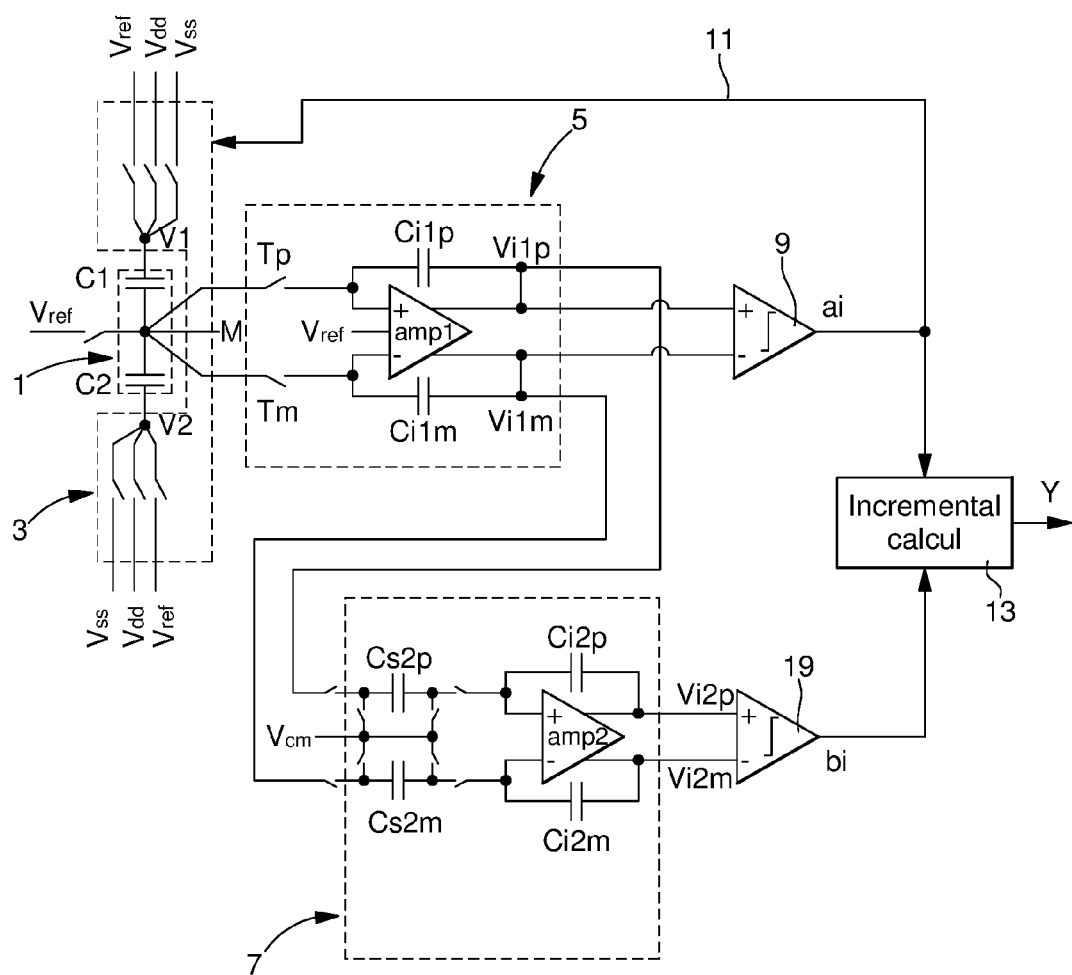
FIG. 1 is a block diagram showing a second order electronic measurement circuit according to one aspect of the present invention.

An embodiment of the present invention will now be described in detail with reference to the attached figures. Identical or corresponding functional and structural elements which appear in the different drawings are assigned the same reference numerals.

The measurement circuit or system shown in FIG. 1 is composed of a measurement sensor 1 comprising the capacitors C1 and C2, a switch circuit 3, a first integrator circuit or unit 5, a first comparator 9, a second integrator circuit or unit 7, a second comparator 19 and a feedback circuit 11. There is further shown an incremental calculation unit 13, which receives the two digital output signals ai, bi from the two comparators 9, 19, and which is also arranged to reduce the sampling rate of the final digital output signal y. It is to be noted that the actual measurement result is given by an output signal after the decimation and is typically a bit string of 12 or 14 bits.

The switch circuit 3 enables the charging or discharging of the capacitors C1 and C2 by a connection to Vref, Vdd and Vss voltage sources, where Vss is the ground or 0 V, Vdd is the maximum voltage applicable in the measurement circuit and Vref is a voltage value between Vss and Vdd, preferably not at Vdd/2. Both of these capacitors are discharged when the voltage across these capacitors is Vref. In the first integrator circuit 5 the differential charge integrator is composed of a first upper branch integrator capacitor Ci1$p$, a first amplifier amp1 and a first lower branch integrator capacitor Ci1$m$. The illustrated differential charge integrator is a symmetrical integrator and integrates charges by the two capacitors Ci1 using the amplifier amp1. This integrator is connected to the node M by an upper branch switch Tp and a lower branch switch Tm.

The first integrator circuit 5 is connected to the second integrator circuit 7 by further switches as shown in FIG. 1, and directly to the first comparator 9. Thus the two analogue output signals Vi1$p$ and Vi1$m$ from the first integrator circuit 5 are arranged to be fed to the first comparator 9 and to the second integrator circuit 7.

The integrator in the second integrator circuit 7 is composed of a second upper branch integrator capacitor Ci2$p$, a second lower branch integrator capacitor Ci2$m$ and a second amplifier amp2. This integrator is also a symmetrically switched integrator and integrates the charge received from the first integrator circuit 5 by using alternatively the capacitors Ci2$p$, Ci2$m$ and the amplifier amp2. There are also shown capacitors Cs2$p$ and Cs2$m$ that also help the integrator to perform the integration of the charges.

The second integrator circuit 7 is in this example directly connected to the second comparator 19 and the two analogue output signals Vi2p and Vi2m from the second integrator circuit 7 are arranged to be fed to the second comparator 19. The second comparator 19 is arranged to compare the two analogue input signals received from the second integrator circuit 7.

Based on the comparison in the first and second comparator 9 and 19, the first comparator output signal ai has either a positive or negative value, or is equal to 1 or 0 (−1), and the second comparator output signal bi has either a positive or negative value, which is 1 or 0 (−1). Said two output signals ai and bi from the first and second comparators 9 and 19 are supplied to the incremental calculation unit 13, which supplies a final digital output signal y of this measurement circuit. Each comparator 9 or 19 can be considered to operate also as an analogue-to-digital converter.

The first comparator output signal ai is then arranged to feed through a feedback signal line 11 the switch circuit 3 to control the switching operation as will be explained later in more detail. The value of the signal ai determines whether the charge to be integrated is positive or negative, i.e. whether the integration is done by the upper branch of the measurement structure or by the lower branch of the measurement structure in particular in the first integrator circuit 5. Because of the way the described circuit integrates charges, the circuit in FIG. 1 can be considered to be a second order sigma delta structure.

If the value of the signal ai is positive, then a positive feedback is applied to the switch circuit 3 and in this example the following sequence of two transitions after the time Tp is applied to the capacitors C1 and C2 as also shown in FIG. 2:

First transition: The electrical potential at V1 is switched from Vref to Vdd while the electrical potential at V2 is switched from Vref to Vss, and the switch Tp is activated or closed so that the difference of the charge stored in C1 and the charge stored in C2 is transferred into the first upper branch integrator capacitor Ci1p. After a given time period the switch Tp is opened.

Second transition: The electrical potential at V1 is switched from Vdd to Vref while the electrical potential at V2 is switched from Vss to Vref, and the switch Tm is activated or closed so that the difference of the charge stored in C1 and the charge stored in C2 is transferred into a first lower branch integrator capacitor Ci1m. After a given time period the switch Tm is opened.

If the value of the signal ai is negative, then negative feedback is applied to the switch circuit 3 and in this example the following sequence of two transitions is applied after the second time defined Tm as also shown in FIG. 2:

First transition: The electrical potential at V1 is switched from Vref to Vss while the electrical potential at V2 is switched from Vref to Vdd, and the switch Tm is activated or closed so that the difference of the charge stored in C1 and the charge stored in C2 is transferred into the first lower branch integrator capacitor Ci1m. After a given time period the switch Tm is opened.

Second transition: The electrical potential at V1 is switched from Vss to Vref while the electrical potential at V2 is switched from Vdd to Vref, and the switch Tp is activated or closed so that the difference of the charge stored in C1 and the charge stored in C2 is transferred into the a first upper branch integrator capacitor Ci1p. After a given time period the switch Tp is opened.

According to the present invention, the integrators are arranged to integrate charge during every voltage transition, i.e. when the voltage across the capacitors C1 and/or C2 is rising or dropping from one value to another. No integration, however, takes place when the voltage value remains constant. The operation of the switches Tp and Tm is preferably synchronized with the operation of the switch circuit 3. In the switch circuit, the voltage switch frequency may be for instance between 100 kHz and 1000 kHz. The voltage switch frequency is preferably constant during the operation of the measurement circuit. The integration of charge is done alternately in the integrators of the upper branch and in the integrators of the lower branch of the measurement circuit. In other words, when the switch Tp is closed, the switch Tm is open, and vice versa.

According to this embodiment, during the initialization phase when Vcm is connected to the second integrator circuit 7, the common node M is connected directly to Vref, and during the normal operation of the circuit the node M remains connected to the virtual ground Vref through the amplifier amp1 and remains thus substantially at constant electrical potential. This property enables the elimination of parasitic capacitance between the node M and ground. Thus, the signal corresponding to the transferred charge is subsequently not affected by the parasitic capacitance.

The operation of a second order analogue front end for capacitive sensing was described above with reference to FIG. 1. The term second order structure is understood here to refer to a structure having two integrator circuits. It is however possible to implement the measurement circuit by using structures of higher orders. Indeed, the greater the number of integrator circuits in the measurement structure, the more the quantization noise can be reduced.

The voltage variations across the capacitors C1 and C2 explained above and illustrated in FIG. 2 induce a transfer of a charge Q into Ci1p, Ci1m and from there to the other integrators' capacitors and the voltage integration at nodes Vi1p and Vi1m depending on the value of the output signal ai. Indeed, the transfer of the charge Q is defined in the upper or positive branch (via the switch Tp) as follows:

The first transition when the value of the signal ai is positive, e.g. +1: Q=dQ1+dQ2, where dQ1=C1·(Vref−Vref)−C1·(Vref−Vdd) and dQ2=C2·(Vref−Vref)−C2·(Vref−Vss), Vref=Vdd/2+Vmax, where dQ1 and dQ2 are the rate of change of the stored charge or surface charge on capacitors C1 and C2, respectively, and Vmax describes a degree of freedom to settle the sensitivity of the system (output signal after decimation/(C1−C2)). Thus, Q=−C1·(−Vdd/2+Vmax)−C2·(Vdd/2+Vmax) or Q=(C1−C2)·Vdd/2−Vmax·(C1+C2).

The second transition when the value of the signal ai is negative, e.g. −1 or 0: Q=dQ1+dQ2, where dQ1=C1·(Vref−Vref)−C1·(Vss−Vref) and dQ2=C2·(Vref−Vref)−C2·(Vdd−Vref), Vref=Vdd/2+Vmax. Thus, Q=C1·(Vdd/2+Vmax)+C2·(−Vdd/2−Vmax) or Q=(C1−C2)·Vdd/2+Vmax·(C1+C2).

As a result, the following expression is obtained:

$$Vi1p(n+1)=Q/Ci1p=((C1-C2)/Ci1p)\cdot Vdd/2-Vmax\cdot((C1+C2)/Ci1p)\cdot ai+Vi1p(n)$$

In the above equation, the variable n denotes a given state. The voltage at Vi1m is the symmetrical node voltage of the voltage at Vi1p, and its equation is:

$$Vi1m(n+1)=Q/Ci1m=-((C1-C2)/Ci1m)\cdot Vdd/2+Vmax\cdot((C1+C2)/Ci1m)\cdot ai-Vi1m(n)$$

One can define the estimation for the second order sigma delta, which is given for example by the incremental calculation as follows:

$\Sigma_i(k-i)\cdot(ai+bi)$ for $i=1$ to $k$ and with a precision of $2/(k\cdot(k+1))$ In the above equation, the variable k is the number of used digital samples ai and bi, which are the series of digital outputs. To achieve a 12-bit resolution conversion, 128 cycles are needed. With the two series of digital outputs ai and bi, it is possible to reconstitute the single shot output y. So the calculation in the unit 13 is operated by the incremental principle.

The measurement circuits described above can be modified in several other ways. For instance, the order of the measurement circuit can be increased to comprise more integrator circuits, or a multiple bit quantizer may be used. Multiple bit structure can be achieved by using a multilevel quantizer and using several transitions (e.g. more than two) for one feedback signal cycle, i.e. for one value of the feedback signal. Irrespective of the slight modifications in the structure, the mean electrostatic force applied by the two fixed electrodes to the central electrode or to the moving mass is zero. Furthermore, thanks to the symmetric structure of the measurement circuit, there is no need for a reset phase for every feedback signal cycle. Indeed, in the present invention, after two transitions, the voltage across C1 and C2 is again switched to Vref, which corresponds to the initial state, which are preferably not at Vdd/2.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. An electronic measurement circuit for measuring a physical parameter, the circuit comprising:
    a measurement sensor comprising two differential mounted capacitors each comprising a fixed electrode, and a common electrode, common to the two capacitors which is arranged to be movable relative to each fixed electrode of the two capacitors in order to alter the capacitive value of each capacitor when the physical parameter is measured;
    a first integrator unit connected to the common electrode for integrating charge received from the measurement sensor, and comprising two integrators arranged to be connected alternately to the common electrode;
    a first comparator for comparing analogue output values from the two integrators of the first integrator unit and for supplying a first digital output signal,
    a second integrator unit connected to integrate charge received from the first integrator unit, the second integrator unit comprising two integrators arranged to integrate charge alternately from the two integrators of the first integrator unit;
    a second comparator for comparing analogue output values from the two integrators of the second integrator unit and for supplying a second digital output signal;
    a switch circuit connected to the measurement sensor for switching different voltage values across the two capacitors;
    a feedback circuit for feeding the first digital output signal from the first comparator to the switch circuit for controlling the operation of the switch circuit, and
    an incremental calculation unit receiving the first digital output signal from the first comparator and the second digital output signal from the second comparator for supplying a final digital output signal of this measurement circuit.

2. The measurement circuit according to claim 1, wherein the first integrator unit and the second integrator unit are connected in series.

3. The measurement circuit according to claim 2, wherein the first integrator unit and the second integrator unit are connected by two switches arranged to operate alternately.

4. The measurement circuit according to claim 1, wherein each of the integrator units comprises one amplifier and two integrator capacitors connected as a symmetrical integrator.

5. A method of measuring a physical parameter by an electronic measurement circuit comprising a measurement sensor comprising two differential mounted capacitors, each comprising a fixed electrode, and a common electrode, common to both of the capacitors, which is arranged to be movable relative to each fixed electrode of the two capacitors in order to alter the capacitive value of each capacitor when the physical parameter is measured, the method comprising:
    a first integrator unit connected to the common electrode integrating charge received from the measurement sensor, wherein the first integrator unit comprises two integrators connected alternately to the common electrode and performing the integration of the charge alternately;
    a first comparator comparing analogue output values from the two integrators of the first integrator unit and supplying a first digital output signal,
    a second integrator unit connected to integrate charge received from the first integrator unit, the second integrator unit comprising two integrators performing the integration of the charge alternately from the two integrators of the first integrator unit;
    a second comparator comparing analogue output values from the two integrators of the second integrator unit and supplying a second digital output signal;
    a feedback circuit feeding a digital output signal from the first comparator to a switch circuit connected to the measurement sensor;
    the switch circuit varying the voltage across the two capacitors as a function of the received first digital output signal, and
    an incremental calculation unit receiving the first digital output signal from the first comparator and the second digital output signal from the second comparator, and supplying a binary output signal of this measurement circuit.

6. The method according to claim 5, wherein the voltage across the two capacitors is switched between at least three different voltage values.

7. The method according to claim 5, wherein one of the voltage values is substantially zero, one of the voltage values represents a maximum voltage, and one of the voltage values is between zero and the maximum voltage.

8. The method according to claim 5, wherein one value of the first comparator output signal causes each of the two integrators of the first integrator unit to integrate alternately the difference of charge between the two capacitors.

9. The method according to claim 6, wherein one value of the first comparator output signal changes the voltage across each of the two capacitors from a first voltage value to a second voltage value and back to the first voltage value.

10. The method according to claim 9, wherein, when the voltage value across one of the capacitors is switched to the second voltage value, the voltage value across the other capacitor is switched to the third voltage value.

11. The method according to claim 5, wherein the common electrode is substantially at a constant electrical potential during the operation of the measurement circuit.

12. The method according to claim 5, wherein the first integrator circuit is connected to the measurement sensor by two switches, and the operation of the two switches is synchronized with the operation of the switch circuit depending on the state of the first digital output signal.

* * * * *